United States Patent
Hamilton et al.

(10) Patent No.: US 9,616,822 B1
(45) Date of Patent: Apr. 11, 2017

(54) MOBILE DEVICE ATTACHMENT FOR A GOLF CART

(71) Applicants: Leslie Ronald Hamilton, Palo Alto, CA (US); John Robert Carr, Gilroy, CA (US)

(72) Inventors: Leslie Ronald Hamilton, Palo Alto, CA (US); John Robert Carr, Gilroy, CA (US)

( * ) Notice: Subject to any disclaimer, the term of this patent is extended or adjusted under 35 U.S.C. 154(b) by 0 days.

(21) Appl. No.: 15/216,100

(22) Filed: Jul. 21, 2016

(51) Int. Cl.
*B60R 11/02* (2006.01)
*B60R 11/00* (2006.01)

(52) U.S. Cl.
CPC ..... *B60R 11/0241* (2013.01); *B60R 2011/001* (2013.01)

(58) Field of Classification Search
CPC .......... B60R 2011/001; B60R 11/0241; B60R 11/0252; B60R 11/0258; B60R 11/0294; B60R 11/0211; Y10S 224/929–224/93; A45F 2200/0508; A45F 2200/0516; A45F 2200/0525; A45F 2200/0533
USPC .......................................... 224/274, 929–930
See application file for complete search history.

(56) References Cited

U.S. PATENT DOCUMENTS

| | | | | |
|---|---|---|---|---|
| 5,025,966 A | * | 6/1991 | Potter | A45F 5/02 224/183 |
| 5,193,777 A | * | 3/1993 | Faulstich | B60N 3/005 108/44 |
| D497,048 S | * | 10/2004 | Pritchard | D3/218 |
| 8,511,524 B2 | * | 8/2013 | Heinl | B60R 7/082 224/274 |
| 8,936,222 B1 | * | 1/2015 | Bastian | A45F 5/00 224/183 |
| 2005/0121579 A1 | * | 6/2005 | Rim | B60R 11/0235 248/288.11 |
| 2011/0024470 A1 | * | 2/2011 | Hajarian | B60R 11/0241 224/276 |
| 2013/0277991 A1 | * | 10/2013 | Wu | A45F 5/00 294/25 |
| 2014/0008405 A1 | * | 1/2014 | Beaver | B60R 11/0241 224/276 |

(Continued)

OTHER PUBLICATIONS

Rubber Coated Magnet Mount for GoPro HERO Cameras. (n.d.). Retrieved Jul. 20, 2016, from https://www.amazon.com/Rubber-Coated-Magnet-Mount-Cameras/dp/B00NF8812S/ref=sr_1_2?ie=UTF8.

(Continued)

*Primary Examiner* — Nathan J Newhouse
*Assistant Examiner* — Scott McNurlen
(74) *Attorney, Agent, or Firm* — Dunlap Bennett & Ludwig PLLC

(57) ABSTRACT

A mobile device attachment for a golf cart is provided. The mobile device attachment includes a plate and a mobile device mount. The plate includes an upper surface, a lower surface opposite the upper surface, a first end and a second end opposite the first end. A ridge is protruding from the upper surface near the first end. The ridge is sized to fit within a clip of a golf cart steering wheel. The plate further includes a first connector disposed near the second end. The mobile device mount includes a base having a second connector releasably securable by magnetic attraction to the first connector. The mobile device mount may further include a pair of jaws that releasably secures a mobile device therebetween.

9 Claims, 4 Drawing Sheets

(56) References Cited

U.S. PATENT DOCUMENTS

| | | | |
|---|---|---|---|
| 2014/0097306 A1* | 4/2014 | Hale | F16M 13/022 |
| | | | 248/122.1 |
| 2015/0144754 A1* | 5/2015 | Elharar | B60R 11/0241 |
| | | | 248/230.8 |
| 2015/0217701 A1 | 8/2015 | Tyrer | |

OTHER PUBLICATIONS

Kenu. (n.d.). Retrieved Jul. 20, 2016, from http://www.kenu.com/#/products/airframe-plus.

Avantek Universal Cell Phone Air Vent Car Mount Holder Cradle—Black. (n.d.). Retrieved Jul. 20, 2016, from https://www.amazon.com/AVANTEK-Universal-Phone-Holder-Cradle/dp/B00ZLPJ10Y.

Robot Check. (n.d.). Retrieved Jul. 20, 2016, from https://www.amazon.com/2win2buy-Motorcycle-Handlebar-Waterproof-Cellphone/dp/B00MQNIUVU.

* cited by examiner

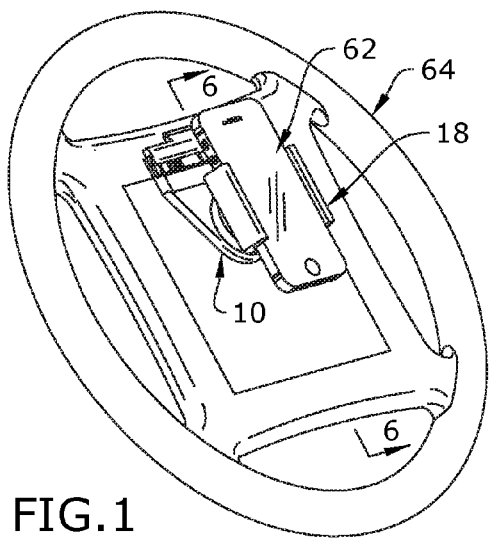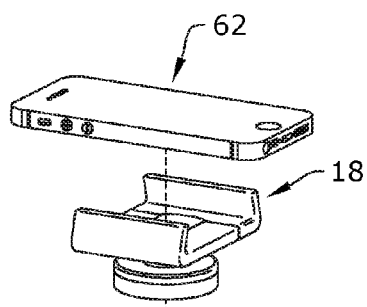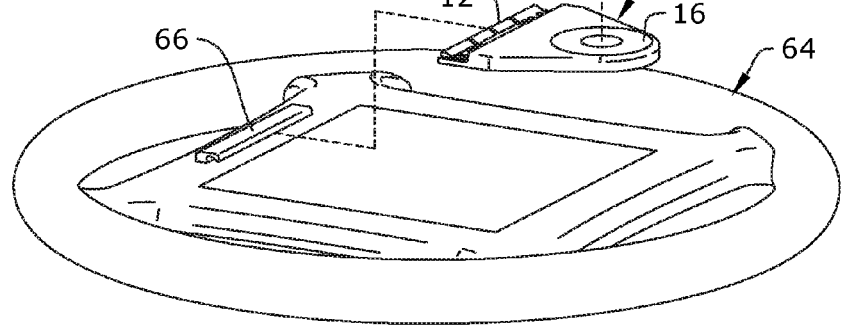
FIG.1
FIG.2
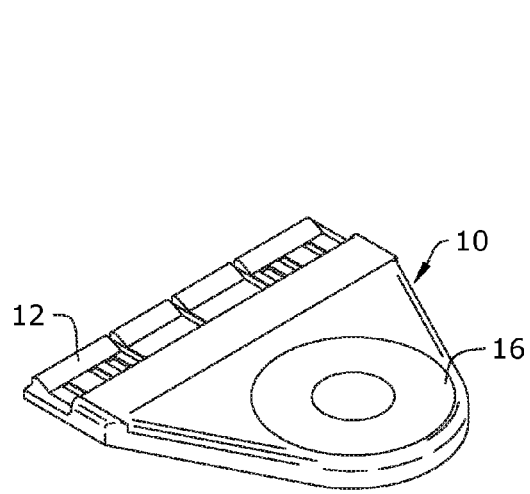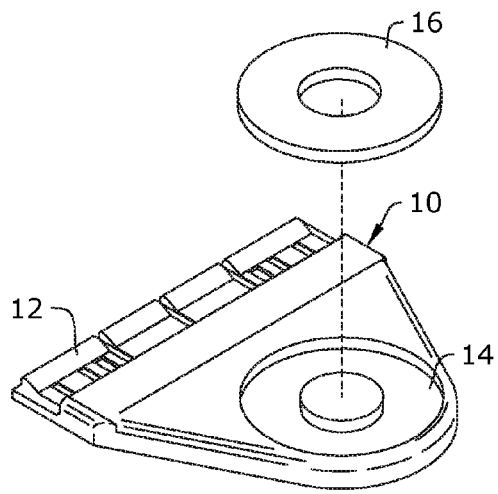
FIG.3
FIG.4

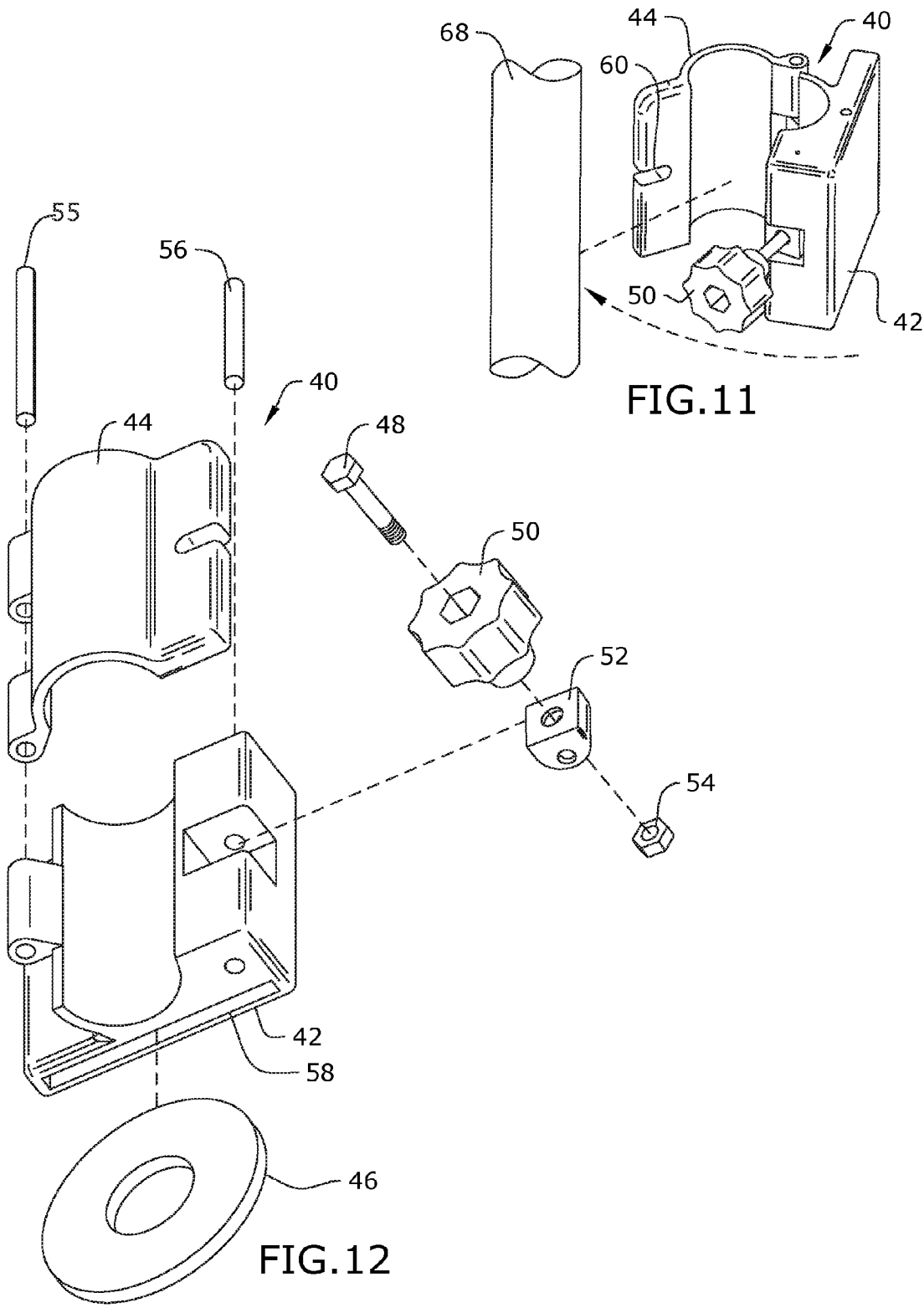

MOBILE DEVICE ATTACHMENT FOR A GOLF CART

BACKGROUND OF THE INVENTION

The present invention relates to golfing and, more particularly, to a mobile device attachment for a golf cart.

Many golfers carry smart phones or computer tablets when playing a round of golf. The smart phones or tablets may include application software to assist the golfer to keep score or to provide the golfer with information about the course being played. However, there is no convenient location on a golf cart to securely hold such electronic devices. Golf carts include open compartments in which the electronic devices can slide around and break. Otherwise, golfers may store their devices in their golf bags which is inconvenient if being used to keep score.

As can be seen, there is a need for a convenient place to mount a smart phone or tablet within the golf cart passenger compartment.

SUMMARY OF THE INVENTION

In one aspect of the present invention, a mobile device attachment for a golf cart comprises: a plate comprising: an upper surface, a lower surface, a first end and a second end; a ridge protruding from the upper surface near the first end, wherein the ridge is sized to fit within a clip of a golf cart steering wheel; and a first connector disposed near the second end; and a mobile device mount comprising: a base comprising a second connector releasably securable to the first connector using magnetic attraction; and a pair of jaws operable to releasably secure a mobile device therebetween.

These and other features, aspects and advantages of the present invention will become better understood with reference to the following drawings, description and claims.

BRIEF DESCRIPTION OF THE DRAWINGS

FIG. 1 is a perspective view of an embodiment of the present invention shown in use;

FIG. 2 is an exploded view of an embodiment of the present invention;

FIG. 3 is a perspective view of a plate of an embodiment of the present invention;

FIG. 4 is an exploded view of the plate of FIG. 3;

FIG. 11 is a perspective view of an alternate embodiment of the present invention illustrating a clamp being in an open position; and FIG. 12 is an exploded view of an alternate embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a device that attaches a mobile device to a golf cart or similar vehicle without modification to the cart or the appliance and permitting easy mounting and demounting. The present invention may include two parts. The first part replaces the scorecard and is secured to the vehicle steering wheel by the scorecard clip. This first part contains a ferrous plate. The second part includes a moveable jaws to hold the mobile device and magnetic plate used to attach to the first part on the wheel. The present invention securely attaches the mobile device in the optimum position on the golf cart steering wheel in seconds without requiring any modifications to the host vehicle.

Figure 5:
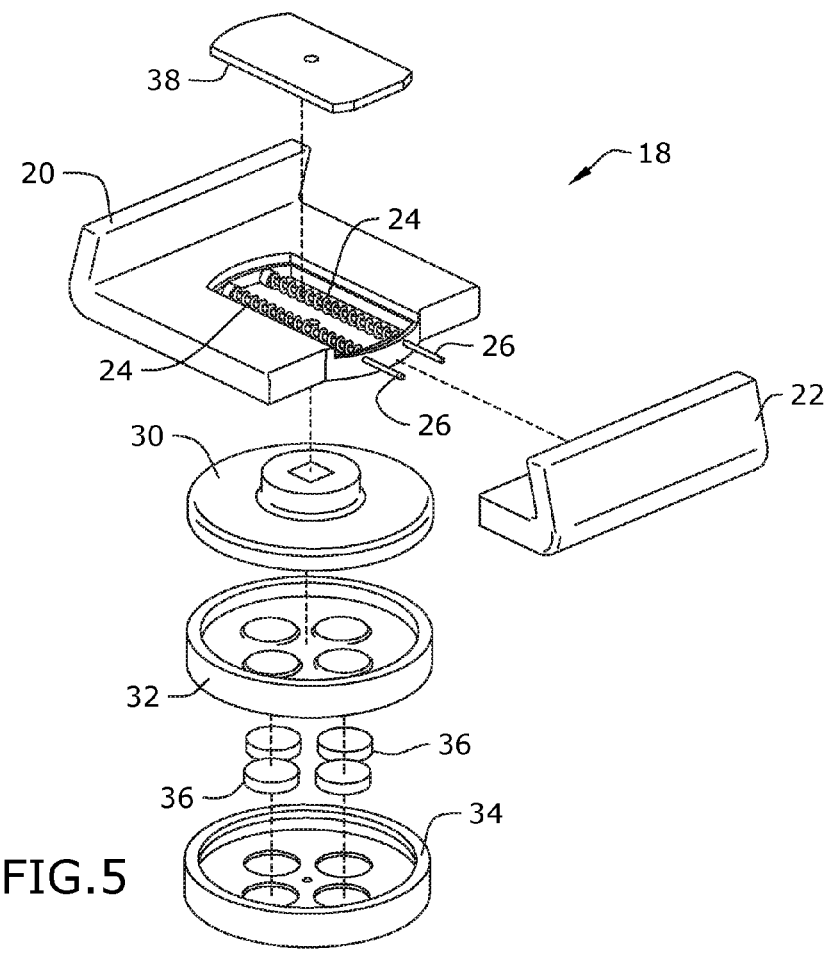
FIG. 5 is an exploded view of a mobile device mount of an embodiment of the present invention.
Figure 6:
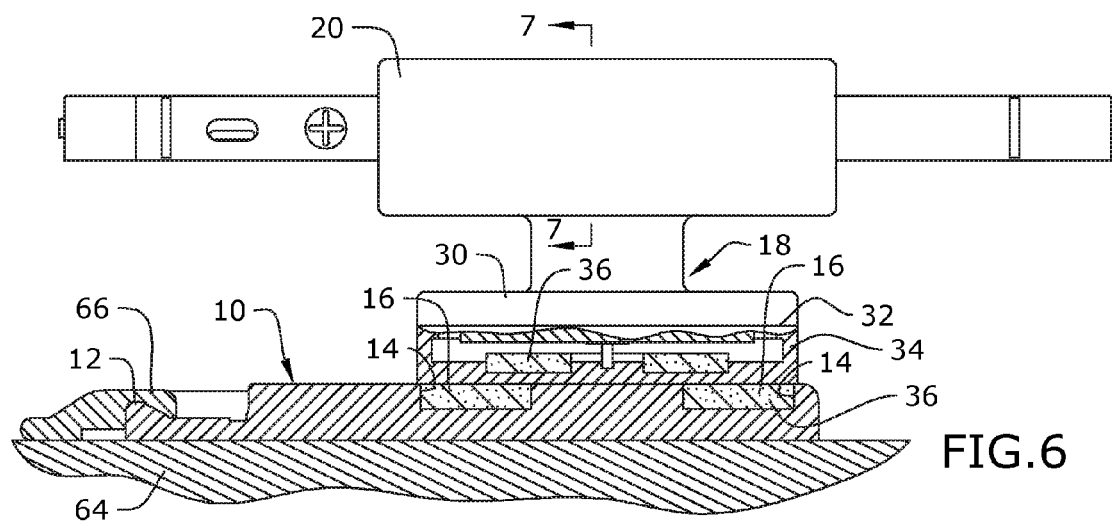
FIG. 6 is a section view of the present invention taken along line 6-6 in FIG. 1.
Figure 7:
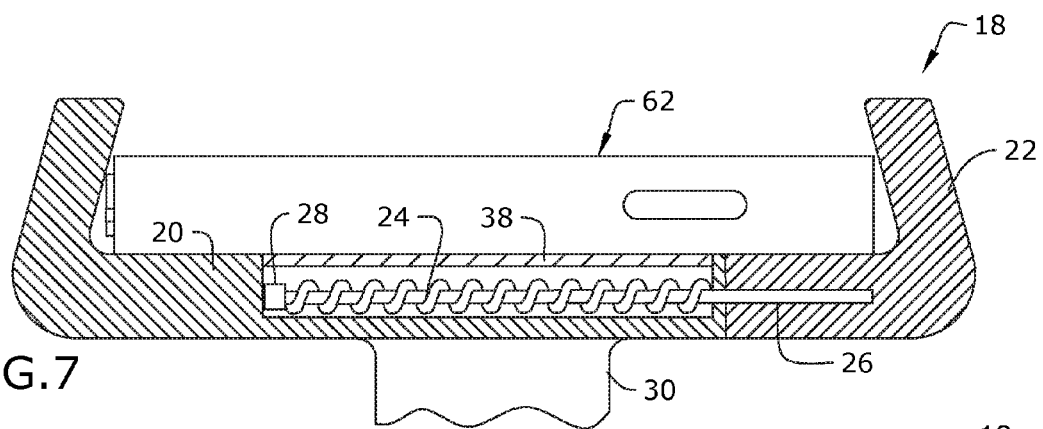
FIG. 7 is a section view of an embodiment of the present invention taken along line 7-7 in FIG. 6.
Figure 8:
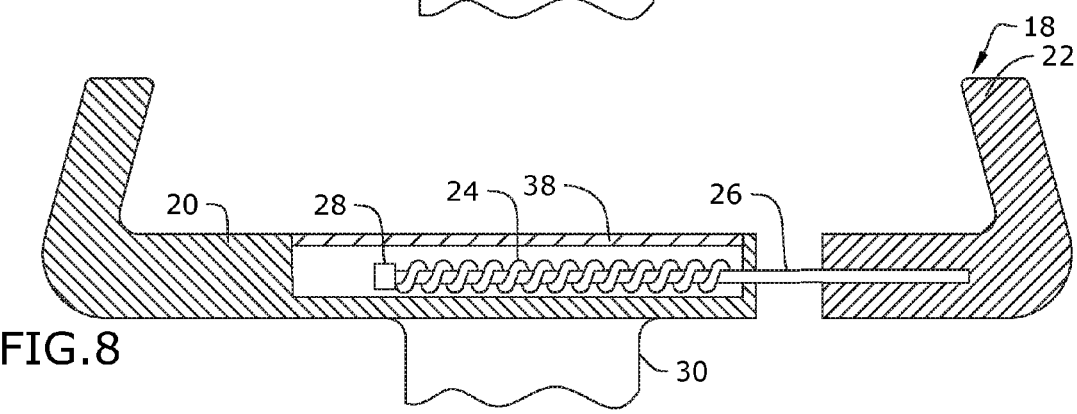
FIG. 8 is a section view of the embodiment of FIG. 7 with jaws extending away from one another against a bias of a spring.

Referring to FIGS. 1 through 7, the present invention includes a mobile device attachment for a golf cart. The mobile device attachment includes a plate 10 and a mobile device mount 18. The plate 10 includes an upper surface, a lower surface opposite the upper surface, a first end and a second end opposite the first end. A ridge 12 is protruding from the upper surface near the first end. The ridge is sized to fit within a clip 66 of a range of the most popular golf cart steering wheels 64. The plate 10 further includes a first connector 16 disposed near the second end. The mobile device mount 18 includes a base 30 having a second connector 36 releasably securable to the first connector 16. The mobile device mount 18 may further include a pair of jaws 20, 22 that releasably secures a mobile device 62 therebetween.

The plate 10 may include a substantially planar upper surface, a substantially planar lower surface and an edge disposed about the perimeter. In certain embodiments, the first end may include a width greater than the width of the second end. Therefore the edge may taper from the first end to the second end. The ridge 12 of the present invention may run along a straight line along a substantial portion of an edge of the first end. The ridge 12 may taper towards the second end. In certain embodiments, a recess may be formed in between the ridge 12 and the second end of the plate 10. The recess may be adjacent to the ridge 12 and may form where the ridge meets the substantially planar upper surface.

The first connector 16 and the second connector 36 may include magnets/ferromagnetic material, clips, snaps and the like. In certain embodiments, the first connector 16 may include a ferrous ring or disk. In such embodiments, the upper surface of the plate 10 may include a circular recess 14. The ferrous ring or disk may be secured within the circular recess by various mechanical means. The second connector 36 may include a magnet or magnetic material attracted to the magnetic ring. In such embodiments, the mobile device mount 18 may be rotated axially relative to the plate 10 while being attached. Therefore, the user may view the mobile device in a horizontal or vertical position.

As mentioned above, the second connector 36 may include a magnetic material, such as magnets or ferromagnetic metals. In such embodiments, the base 30 of the present invention may include an upper cover 32 and a lower cover 34. The upper cover 32 and lower cover 34 may include magnet recesses. The plurality of magnets may fit within the magnet recesses and the upper cover 32 and lower cover 34 may be sealed together. The magnetic material of the second connector 36 is attracted to the ferrous material of the first connector 36. Therefore, the mobile device mount 18 attaches to the plate 10 when in a close proximity.

As mentioned above, the pair of jaws 20, 22 releasably secure a mobile device 62 therebetween. The mobile device 62 of the present invention may be a smart device, such as a smart phone or tablet. Alternatively, the mobile device 62 may be a device specifically made for golfing, which may include a global positioning system (GPS). Each of the jaws 20, 22 may include a soft rubber inner surface for additional grip of the mobile device. The distance between the pair of jaws 20, 22 is adjustable. In such embodiments, the present invention includes a pair of rods 26. Each of the rods 26 includes a first portion disposed within a housing of a first jaw 20. A cover 38 may be secured over the housing. A head 28 may be disposed at an end of the first portion. A second portion of the rods 26 runs through an aperture formed through the housing and is secured to a second jaw 22. A first spring 24 surrounds one of the rods 26 and a second spring 24 surround the other of the rods 26. The springs 24 may be disposed in between the head 28 and the aperture. The spring 24 biases the pair of jaws 20, 22 together. Therefore, a user may separate the jaws 20, 22 against the bias of the springs 24, place the mobile device 62 in between the jaws 20, 22 and release the jaws 20, 22 so that the jaws 20, 22 apply pressure against the mobile device 62, and secure the mobile device 62 therebetween.

Figures 9, 10:
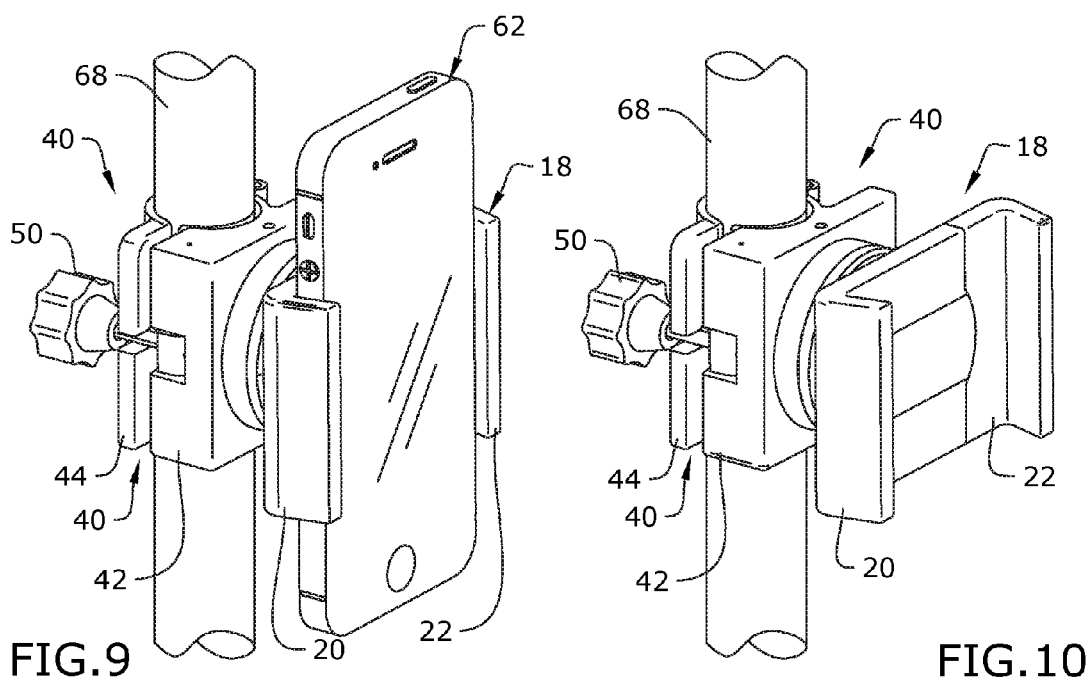
FIG. 9 is a perspective view of an alternate embodiment of the present invention shown in use.
FIG. 10 is a perspective view of an alternate embodiment of the present invention.

Referring to FIGS. 9 through 12, the present invention may include a pole holder 40. The pole holder 40 may include a first clamp portion 42 and a second clamp portion 44. Each of the first and second clamp portions 42, 44 include internal half pipe shaped channels sized to secure around a pole 68 of the golf cart or similar apparatus (Bicycle, Baby Stroller, Mail Cart, Wheelchair, Fishing Rod, etc.). The first and second clamp portions 42, 44 may be pivotally secured together by a pivot rod 55. One of the first and second clamp portions 42, 44 may include a slot 58. A magnetic ring or disk 46 may secure within the slot 58. To clamp the first and second clamp portion 42, 44 together, the present invention may include a knob bracket 52 pivotally secured to one of the first and second clamp portion 42, 44 by a pivot pin 56. A knob 50 may be secured to the knob bracket 52 by a bolt 48 that runs through the knob and the knob bracket 52 and is secured by a nut 54. The bolt 48 may fit within a slot 60 formed in the other of the first and second clamp portions 42 and the knob 50 may be tightened, thereby clamping the first and second clamp portions 42, 44 to the pole 68. The mobile device mount 18 may be releasably secured to the pole holder 40.

It should be understood, of course, that the foregoing relates to exemplary embodiments of the invention and that modifications may be made without departing from the spirit and scope of the invention as set forth in the following claims.

What is claimed is:

1. A mobile device attachment for a golf cart comprising:
a plate comprising:
an upper surface, a lower surface, a first end and a second end;
a plurality of ridges spaced apart and aligned along a common axis formed at an edge of the first end, the plurality of ridges protruding from the upper surface near the first end, wherein the ridges are sized to fit within a clip of a golf cart steering wheel; and
a first connector disposed near the second end; and
a mobile device mount comprising:
a base comprising a second connector releasably securable to the first connector; and
a pair of jaws operable to releasably secure a mobile device therebetween.

2. The mobile device attachment of claim 1, wherein the first connector and the second connector each comprise a magnetic material.

3. The mobile device attachment of claim 2, wherein the upper surface of the plate comprises a recess, wherein the first connector comprises a magnetic ring secured within the recess.

4. The mobile device attachment of claim 1, wherein a recess is formed in between the ridges and the second end of the plate.

5. The mobile device attachment of claim 1, wherein the ridges taper towards the second end.

6. The mobile device attachment of claim 2, wherein the base comprises an upper cover and a lower cover, wherein the second connector comprises at least one magnet disposed therebetween.

7. The mobile device attachment of claim 1, further comprising:
at least one rod comprising a first portion and a second portion, wherein the first portion is disposed within a housing of one of the pair of jaws and comprises a head, wherein the second portion runs through an aperture formed through the housing and is secured to the other of the pair of jaws; and
a spring surrounding the rod and disposed in between the head and the aperture, wherein the spring biases the pair of jaws together.

8. The mobile device attachment of claim 7, wherein the at least one rod is a pair of rods each comprising a spring.

9. A mobile device attachment for a golf cart comprising:
a plate comprising:
an upper surface, a lower surface opposite the upper surface, a first end and a second end opposite the first end;
a plurality of ridges spaced apart and aligned along a common axis formed at an edge of the first end, the plurality of ridges protruding from the edge of the first end, wherein the ridges are sized to fit within a clip of a golf cart steering wheel; and
a first magnetic material secured within a recess formed in the upper surface and disposed near the second end; and
a mobile device mount comprising:
a base comprising an upper side and a lower side opposite the upper side, wherein the base comprises a second magnetic material secured to the lower side and attracted to the first magnetic material; and
a pair of jaws extending from opposing ends of the upper side of the base, wherein a distance between the pair of jaws is adjustable.

* * * * *